United States Patent
Wang et al.

(10) Patent No.: US 11,051,193 B2
(45) Date of Patent: Jun. 29, 2021

(54) CONFIGURABLE MEASUREMENT GAP AND WINDOW FOR MACHINE TYPE COMMUNICATIONS

(71) Applicant: Qualcomm Incorporated, San Diego, CA (US)

(72) Inventors: Renqiu Wang, San Diego, CA (US); Madhavan Srinivasan Vajapeyam, San Diego, CA (US); Hao Xu, San Diego, CA (US); Wanshi Chen, San Diego, CA (US); Peter Gaal, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 15/215,148

(22) Filed: Jul. 20, 2016

(65) Prior Publication Data

US 2017/0026863 A1 Jan. 26, 2017

Related U.S. Application Data

(60) Provisional application No. 62/220,930, filed on Sep. 18, 2015, provisional application No. 62/195,724, filed on Jul. 22, 2015.

(51) Int. Cl.
*H04W 24/10* (2009.01)
*H04W 4/70* (2018.01)
*H04L 5/00* (2006.01)

(52) U.S. Cl.
CPC ........... *H04W 24/10* (2013.01); *H04L 5/0048* (2013.01); *H04L 5/0053* (2013.01); *H04W 4/70* (2018.02)

(58) Field of Classification Search
CPC .................................................. H04W 24/10
See application file for complete search history.

(56) References Cited

U.S. PATENT DOCUMENTS

| 9,622,230 B2 | 4/2017 | Chen et al. | |
|---|---|---|---|
| 2013/0163543 A1* | 6/2013 | Freda | H04W 72/0406 370/329 |

FOREIGN PATENT DOCUMENTS

| CN | 1798371 A | 7/2006 |
|---|---|---|
| CN | 102137383 A | 7/2011 |

(Continued)

OTHER PUBLICATIONS

Intel Corporation: "On Paging Enhancements for MTC", 3GPP draft, R1-153412—Intel mtc paging, 3rd Generation Partnership Project (3GPP), Mobile Competence Centre, 650, Route Des Lucioles, F-06921 Sophia-Antipolis Cedex, France, vol. RAN WG1, No. Fukuoka. Japan, May 25, 2015-May 29, 2016 May 22, 2015 (May 22, 2015), XP050977671, Retrieved from the Internet: URL: http://www.3gpp.org/ftp/tsg_ran/WG1_RL_1/TSGR1_81/Docs/ [retrieved on May 22, 2015] figure 3.

(Continued)

*Primary Examiner* — Chi H Pham
*Assistant Examiner* — Raul Rivas

(57) ABSTRACT

Aspects of the present disclosure provided techniques that for wireless communications by a base station (BS). An exemplary method, performed by a base station, generally includes identifying an operating state of a user equipment that communicates with the BS in at least one narrowband region, determining, based on the operating state, one or more operating parameters of a configurable measurement procedure whereby the user equipment (UE) tunes away from the narrowband region to measure signals transmitted from other BSs, and configuring the UE to perform the (Continued)

measurement procedure in accordance with the determined operating parameters.

26 Claims, 10 Drawing Sheets

(56) References Cited

FOREIGN PATENT DOCUMENTS

| WO | 2013163543 | A1 | 10/2013 |
|---|---|---|---|
| WO | 2013173673 | A2 | 11/2013 |
| WO | WO-2014204285 | A1 | 12/2014 |
| WO | WO-2015012654 | A1 | 1/2015 |

OTHER PUBLICATIONS

International Search Report and Written Opinion—PCT/US2016/043350—ISA/EPO—dated Sep. 14, 2016.

LG Electronics: "Details on M-PDCCH Search Space Design", 3GPP Draft, R1-152698 Details on M-PDCCH Search Space Design, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015 May 16, 2015 (May 16, 2015), XP050973962, 8 pages, Retrieved from the Internet: http://www.3gpp.org/ftp/tsg_ran/WG1_RL1/TSGR1_81/Docs/ [retrieved on May 16, 2015] figures 2-3.

Intel Corporation: "On Measurement and Retuning Gaps for MTC," 3GPP Draft, R1-152614, 3GPP TSG RAN WG1, Meeting #81, Fukuoka, Japan, May 24, 2015, 3 Pages, XP050973002, Retrieved from the Internet: URL: http://www.3gpp.org/ftp/Meetings_3GPP_SYNC/RAN1/Docs/ [retrieved on May 24, 2015].

LG Electronics: "Measurement Gap Configuration and Measurement for MTC UEs," 3GPP Draft, R1-152697, 3GPP TSG RAN WG1, Meeting #81, Fukuoka, Japan, May 24, 2015, 3 Pages, XP050973951, Retrieved from the Internet: URL: http://www.3gpp.org/ftp/Meetings_3GPP_SYNC/RAN1/Docs/ [retrieved on May 24, 2015].

\* cited by examiner

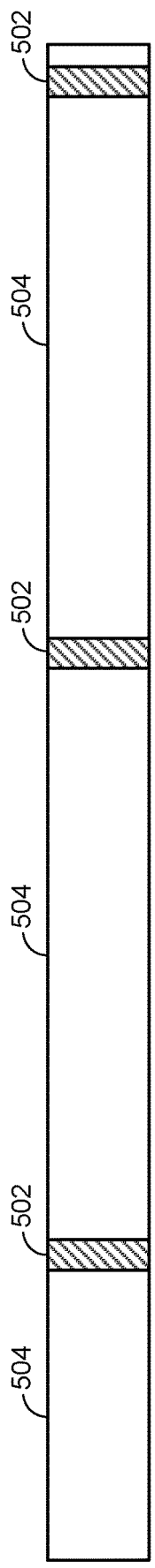
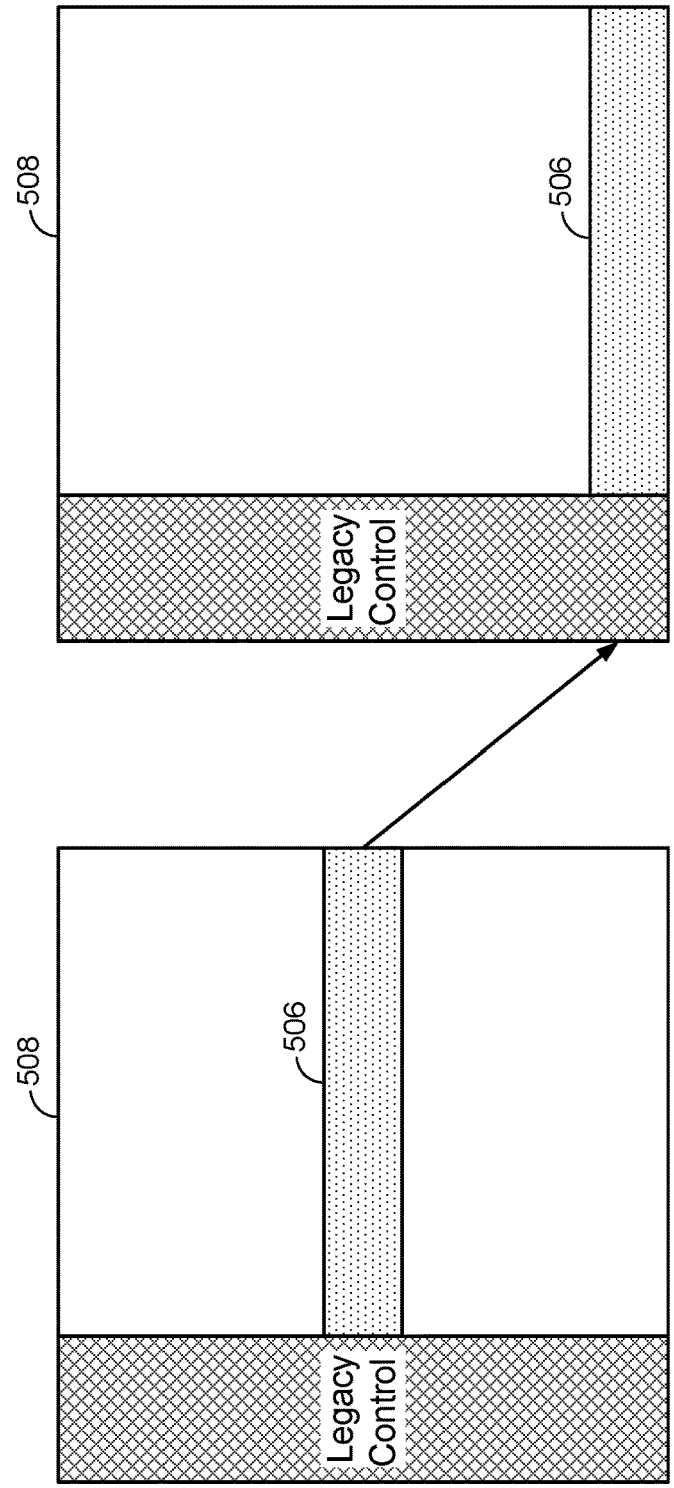
FIG. 5A
FIG. 5B

CONFIGURABLE MEASUREMENT GAP AND WINDOW FOR MACHINE TYPE COMMUNICATIONS

CLAIM OF PRIORITY UNDER 35 U.S.C. § 119

The present Application for Patent claims benefit of U.S. Provisional Patent Application Ser. No. 62/195,724, filed Jul. 22, 2015 and U.S. Provisional Patent Application Ser. No. 62/220,930, filed Sep. 18, 2015, and assigned to the assignee hereof and hereby expressly incorporated by reference herein.

BACKGROUND

I. Field

Certain aspects of the present disclosure generally relate to wireless communications and, more particularly, to configuring a measurement gap and window.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

Certain aspects of the present disclosure provide techniques and apparatus for configuring a measurement gap and window.

Certain aspects of the present disclosure provide a method for wireless communications by a base station (BS). The method generally includes identifying an operating state of a user equipment that communicates with the BS in at least one narrowband region, determining, based on the operating state, one or more operating parameters of a configurable measurement procedure whereby the user equipment (UE) tunes away from the narrowband region to measure signals transmitted from other BSs, and configuring the UE to perform the measurement procedure in accordance with the determined operating parameters.

Certain aspects of the present disclosure provide a method for wireless communications by user equipment (UE). The method generally includes identifying at least one narrowband region in which the UE communicates with a base station (BS), receiving signaling, from the BS, with one or more operating parameters determined based on an operating state of the UE, configuring the UE to perform a measurement procedure whereby the UE tunes away from the narrowband region to measure reference signals transmitted from other BSs, and performing the measurement procedure in accordance with the signaled operating parameters.

Certain aspects of the present disclosure provide an apparatus for wireless communications by a base station (BS). The apparatus generally includes at least one processor configured to identify an operating state of a user equipment that communicates with the BS in at least one narrowband region, determine, based on the operating state, one or more operating parameters of a configurable measurement procedure whereby the user equipment (UE) tunes away from the narrowband region to measure signals transmitted from other BSs, configure the UE to perform the measurement procedure in accordance with the determined operating parameters, and a memory coupled to the at least one processor.

Certain aspects of the present disclosure provide an apparatus for wireless communications by a user equipment (UE). The apparatus generally includes at least one processor configured to identify at least one narrowband region in which the UE communicates with a base station (BS), receive signaling, from the BS, with one or more operating parameters determined based on an operating state of the UE, configuring the UE to perform a measurement procedure whereby the UE tunes away from the narrowband region to measure reference signals transmitted from other BSs, perform the measurement procedure in accordance with the signaled operating parameters, and a memory coupled to the at least one processor.

BRIEF DESCRIPTION OF THE DRAWINGS

FIGS. 5A and 5B illustrate example frame structures that may be used for machine type communications (MTC), in accordance with certain aspects of the present disclosure.

DETAILED DESCRIPTION

Aspects of the present disclosure provide techniques that may help enable efficient communication between a base station and machine type communication (MTC) based user equipments (UEs). For example, the techniques may provide a design for a control channel targeting MTC UEs, using a narrowband (e.g., a six physical resource block (PRB)) based search space for communication.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
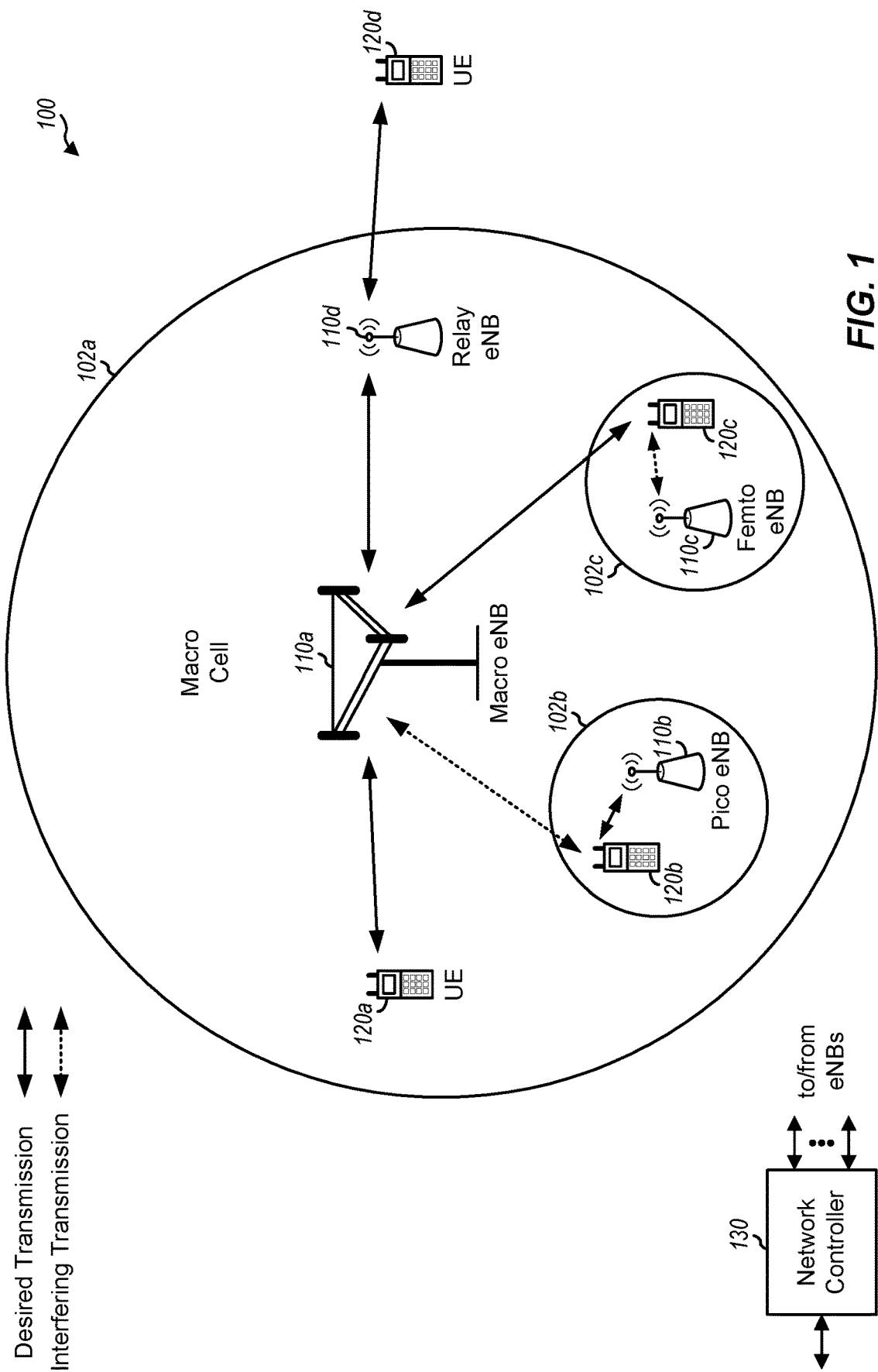
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110*a* may be a macro eNB for a macro cell 102*a*, an eNB 110*b* may be a pico eNB for a pico cell 102*b*, and an eNB 110*c* may be a femto eNB for a femto cell 102*c*. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110*d* may communicate with macro eNB 110*a* and a UE 120*d* in order to facilitate communication between eNB 110*a* and UE 120*d*. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost (LC), low data rate devices, e.g., such as MTC UEs, enhance MTC (eMTC) UEs, etc. The MTC UEs may co-exist with legacy and/or advanced UEs in the LTE network and may have one or more capabilities that are limited when compared to the other UEs (e.g., non-MTC UEs) in the wireless network. For example, in LTE Rel-12, when compared to legacy and/or advanced UEs in the LTE network, the MTC UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the MTC UEs may have a relaxed switching timing from transmit to receive (or from receive to transmit) operations. For example, in one case, compared to a switching timing of 20 microseconds (us) for legacy and/or advanced UEs, the MTC UEs may have a relaxed switching timing of 1 millisecond (ms).

In some cases, the MTC UEs (e.g., in LTE Rel-12) may also be able to monitor downlink (DL) control channels in the same away as legacy and/or advanced UEs in the LTE network monitor DL control channels. Release 12 MTC UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

The wireless communication network 100, as an alternative or in addition to supporting MTC operation, may support additional MTC enhancements (e.g., eMTC operations). For example, LC eMTC UEs (e.g., in LTE Rel-13) may be able to support narrowband operation (e.g., limited to a particular narrowband assignment of 1.4 MHz or six resource blocks (RBs) partitioned out of the available system bandwidth) while co-existing within a wider system bandwidth (e.g., at 1.4/3/5/10/15/20 MHz). The LC eMTC UE may also be able to support one or more coverage modes of operation. For example, the LC eMTC UE may be able to support coverage enhancements up to 15 dB.

As used herein, devices with limited communication resources, such as MTC devices, eMTC devices, etc. are referred to generally as MTC UEs. Similarly, legacy devices, such as legacy and/or advanced UEs (e.g., in LTE) are referred to generally as non-MTC UEs.

In some cases, a UE (e.g., MTC UE or non-MTC UE) may perform a cell search and acquisition procedure before communicating in the network. In some cases, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
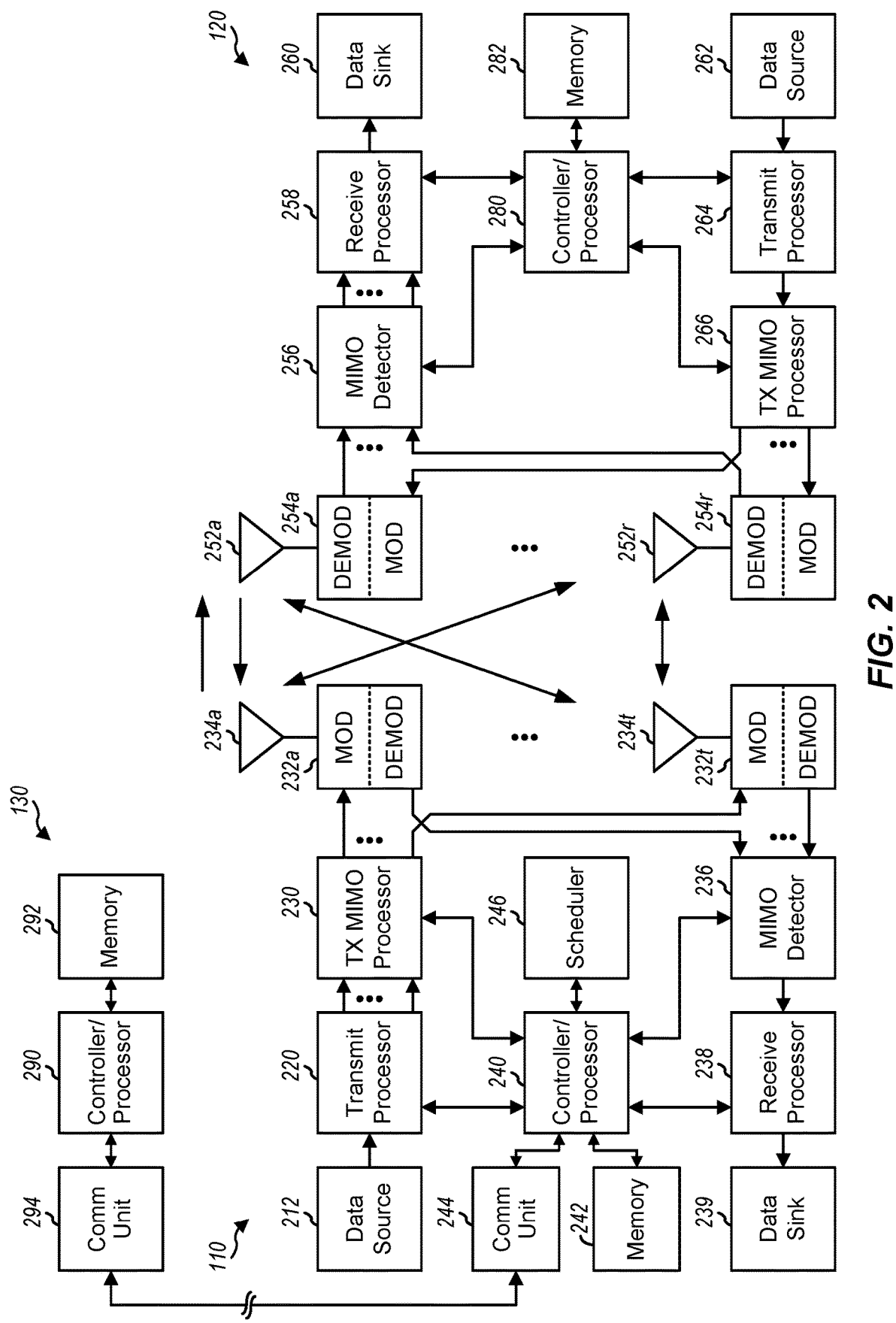
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and modules at base station 110 may perform direct operations 700 shown in FIG. 7. Similarly, processor 280 and/or other processors and modules at UE 120, may perform or direct operations 800 shown in FIG. 8. Memories 242 and 282 may store data and program codes for base station 110 and UE 120, respectively. A scheduler 246 may schedule UEs for data transmission on the downlink and/or uplink.

Figure 3:
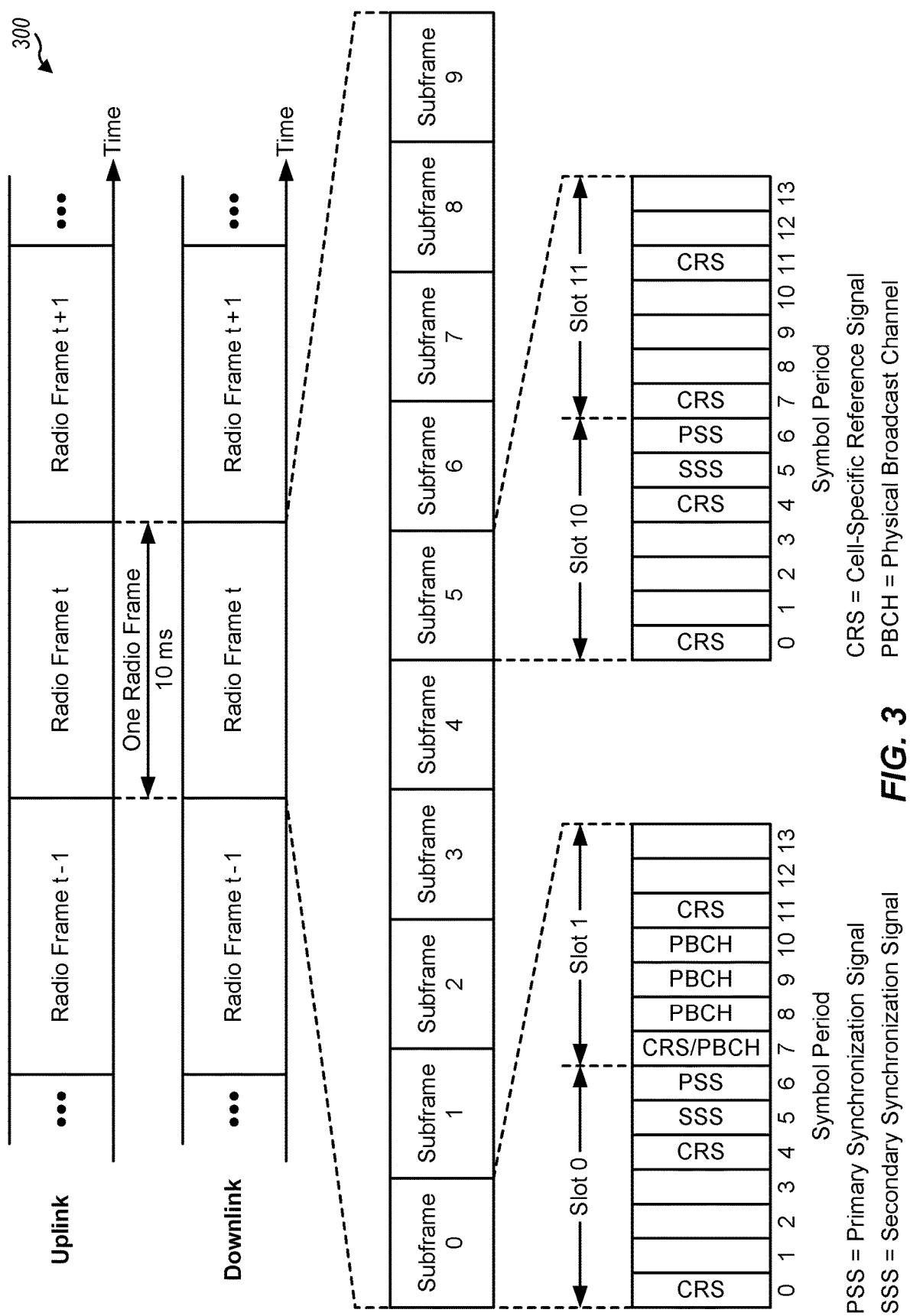
FIG. 3 shows an exemplary frame structure for FDD in LTE.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Channel quality measurements may be performed by a UE according to a defined schedule, such one based on the DRX cycle of the UE. For example, a UE may attempt to perform measurements for a serving cell at every DRX cycle. The UE may also attempt to perform measurements for non-serving neighboring cells. Measurements for non-serving neighbor cells may be made based on a different schedule than for serving cells and the UE may need to tune away from the serving cell to measure non-serving cells when the UE is in connected mode.

To facilitate channel quality measurements, an eNB may transmit a cell specific reference signal (CRS) on specific subframes. For example, an eNB may transmit CRS over subframes 0 and 5 for a given frame. A MTC UE may receive this signal and measure the average power of the received signal, or RSRP. The MTC UE may also calculate a Receive Signal Strength Indicator (RSSI) based on the total received signal power from all sources. A RSRQ may be also be calculated based on the RSRP and RS SI.

To facilitate measurements, an eNB may provide a measurement configuration to UEs in its coverage area. The measurement configuration may define event triggers for measurement reporting and each event trigger may have associated parameters. When the UE detects a configured measurement event, it may respond by sending a measurement report to the eNB with information about the associated measurement objects. A configured measurement event may be, for example, a measured reference signal received power (RSRP) or a measured reference signal received quality (RSRQ) satisfying a threshold. A time-to-trigger (TTT) parameter can be used to define how long a measurement event must persist before the UE sends its measurement report. In this way, the UE can signal changes in its radio conditions to the network.

Figure 4:
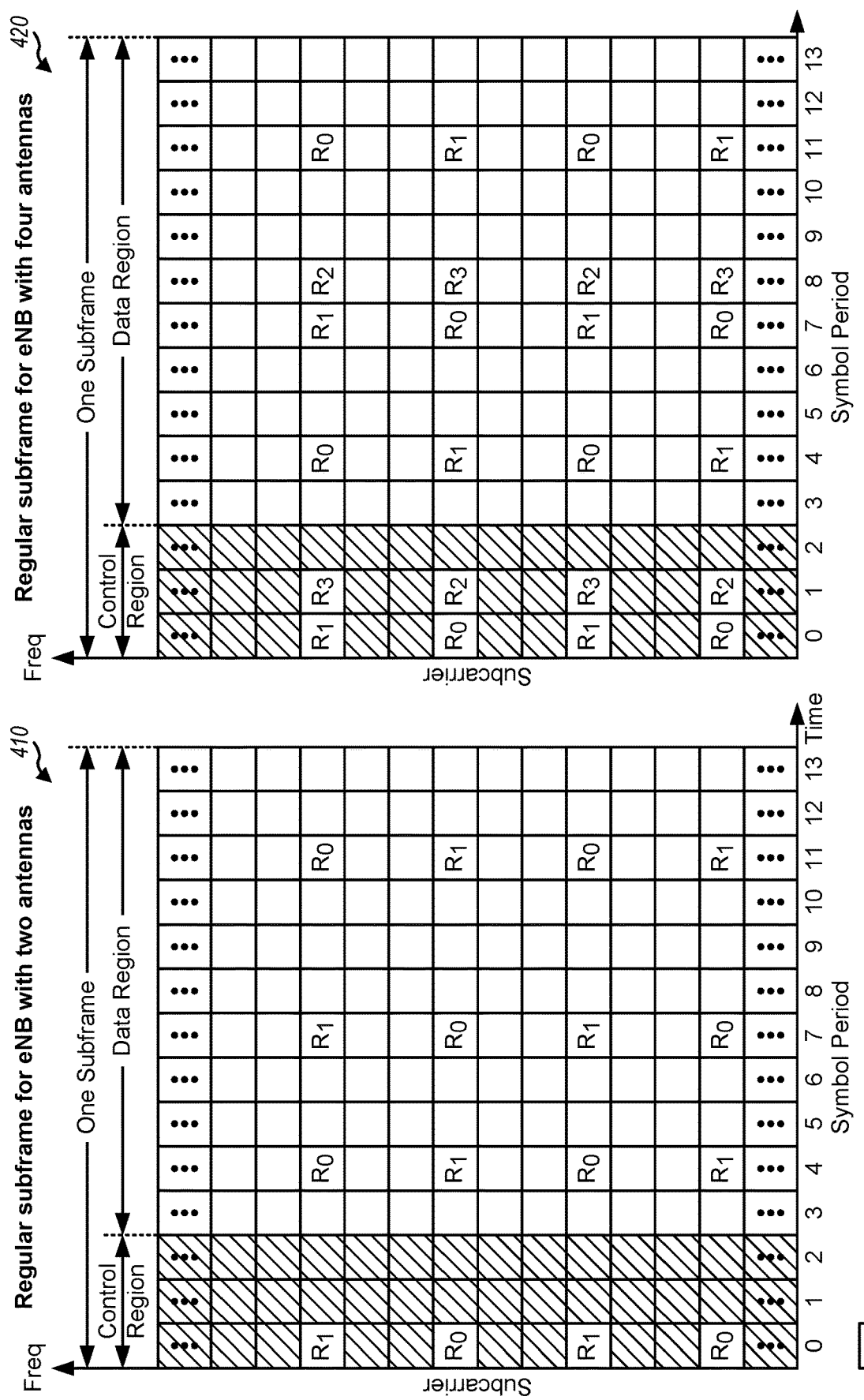
FIG. 4 shows two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

As described above, one or more UEs in the wireless communication network (e.g., wireless communication network 100) may be devices that have limited communication resources, such as MTC UEs, as compared to other (non-MTC) devices in the wireless communication network. For MTC UEs, various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some systems, for example, in LTE Rel-13, the MTC may be limited to a particular narrowband assignment (e.g., of no more than six resource blocks (RBs)) within the available system bandwidth. However, the MTC may be able to re-tune (e.g., operate and/or camp) to different narrowband regions within the available system bandwidth of the LTE system, for example, in order to co-exist within the LTE system. For example, an eMTC UE may transmit and receive in a narrowband region of a system bandwidth.

FIGS. 5A and 5B, for example, illustrate an example of how MTCs in MTC operation may co-exist within a wideband system, such as LTE. As illustrated in the example frame structure of FIG. 5A, subframes associated with MTC and/or MTC operations 502 may be time division multiplexed (TDM) with regular subframes 504 associated with LTE (or some other RAT) operating in a wider system bandwidth (e.g., 1.4/3/5/10/15/20 MHz). Additionally or alternatively, as illustrated in the example frame structure of FIG. 5B, one or more narrowbands (e.g., narrowband regions) 506 used by MTCs in MTC may be frequency division multiplexed within the wider bandwidth 508 supported by LTE.

Multiple narrowband regions, with each narrowband region spanning a bandwidth that is no greater than a total of 6 RBs, may be supported for MTC and/or MTC operation. In some cases, each MTC in MTC operation may operate within one narrowband region (e.g., at 1.4 MHz or 6 RBs) at a time. However, MTCs in MTC operation, at any given time, may re-tune to other narrowband regions in the wider system bandwidth. In some examples, multiple MTCs may be served by the same narrowband region. In other examples, multiple MTCs may be served by different narrowband regions (e.g., with each narrowband region spanning 6 RBs). In yet other examples, different combinations of MTCs may be served by one or more same narrowband regions and/or one or more different narrowband regions.

Some systems, for example, in LTE Rel-13, introduce coverage enhancements and support for eMTC, as well as other UEs. As used herein, the term coverage enhancement generally refers to any type of mechanism that extends the coverage range of a device (such as an eMTC device) within a network. One approach for coverage enhancement (CE) is bundling which refers to transmitting the same data multiple times (e.g., across multiple subframes or, as will be described in greater detail below, across multiple symbols within a same subframe).

As another example of coexistence within the LTE system, MTCs may be able to receive (with repetition) legacy physical broadcast channel (PBCH) (e.g., the LTE physical channel that, in general, carries various parameters that may be used for initial access to the cell) and support one or more legacy physical random access channel (PRACH) formats. For example, the MTC may be able to receive the legacy PBCH with one or more additional repetitions of the PBCH across multiple subframes. As another example, the MTC may be able to transmit one or more repetitions of PRACH (e.g., with one or more PRACH formats supported) to an eNB in the LTE system. The PRACH may be used to identify the MTC. Also, the number of repeated PRACH attempts may be configured by the eNB.

The MTC may also be a link budget limited device and may operate in different modes of operation (e.g. entailing different amounts of repeated messages transmitted to the MTC) based on its link budget limitation. For example, in some cases, the MTC may operate in a normal coverage mode in which there is little to no repetition (i.e., the amount of repetition needed for the UE to successfully receive a message may be low or repetition may not even be needed). Alternatively, in some cases, the MTC may operate in a coverage enhancement (CE) mode in which there may be high amounts of repetition. For example, for a 328 bit payload, a MTC in CE mode may need 150 or more repetitions of the payload in order to successfully receive the payload.

In some cases, e.g., also for LTE Rel-13, the MTC UE may have limited capabilities with respect to its reception of broadcast and unicast transmissions. For example, the maximum transport block (TB) size for a broadcast transmission received by the MTC UE may be limited to 1000 bits. Additionally, in some cases, the MTC UE may not be able to receive more than one unicast TB in a subframe. In some cases (e.g., for both the CE mode and normal mode described above), the MTC UE may not be able to receive more than one broadcast TB in a subframe. Further, in some cases, the MTC UE may not be able to receive both a unicast TB and a broadcast TB in a subframe.

MTCs that co-exist in the LTE system may also support new messages for certain procedures, such as paging, random access procedure, etc. (e.g., as opposed to conventional messages used in LTE for these procedures). These new messages for paging, random access procedure, etc. may be separate from the messages used for similar procedures associated with non-MTCs. For example, as compared to conventional paging messages used in LTE, MTCs may able to monitor and/or receive paging messages that non-MTCs may not able to monitor and/or receive. Similarly, as compared to conventional random access response (RAR) messages used in a conventional random access procedure, MTCs may be able to receive RAR messages that also may not be able to be received by non-MTCs. The new paging and RAR messages associated with MTCs may also be repeated one or more times (e.g., "bundled"). In addition, different numbers of repetitions (e.g., different bundling sizes) for the new messages may be supported.

Certain systems may provide MTC UEs with coverage enhancements of up to 15 dB, which maps to 155.7 dB maximum coupling loss between the UE and an eNB. Accordingly, eMTC UEs and eNB may perform measurements at low SNRs (e.g., -15 dB to -20 dB). In some systems, coverage enhancements may include channel bundling, wherein messages associated with eMTC UEs may be repeated (e.g., bundled) one or more times.

Figure 6:
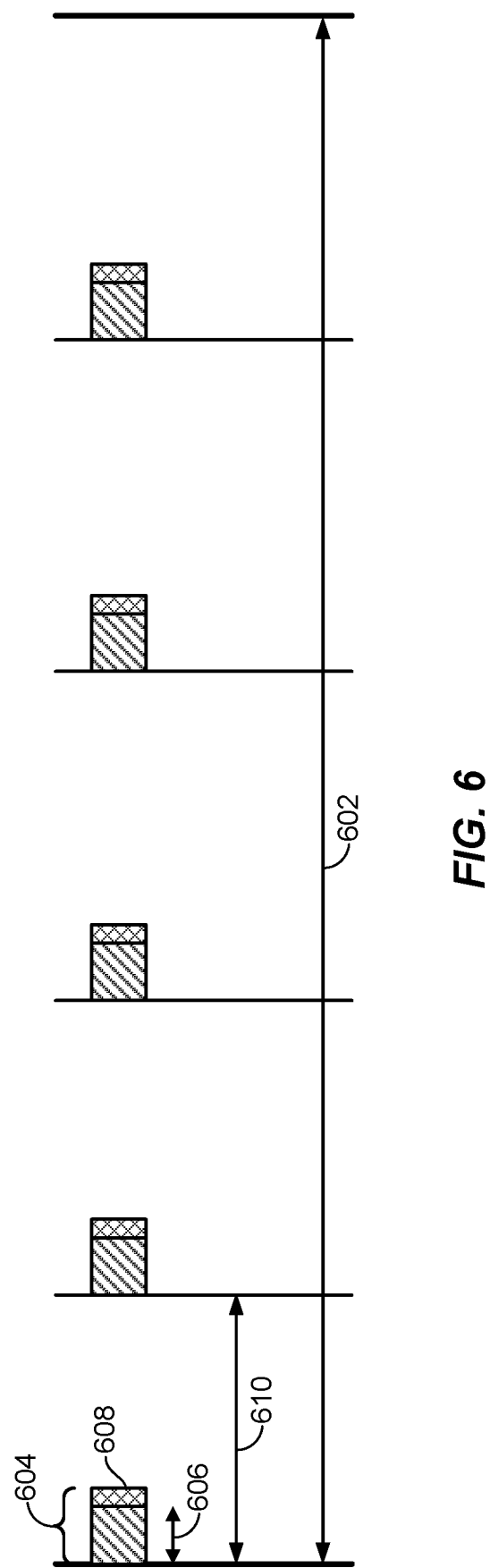
FIG. 6 illustrates an example measurement window, in accordance with certain aspects of the present disclosure.

FIG. 6 illustrates an example measurement window 602. MTC UEs typically perform cell quality measurements over the measurement window 602. For example, as described above, MTC UEs may perform channel estimation, channel quality measurements, or other measurements for a serving cell and/or a neighboring cell during the measurement window.

In current systems, the measurement window 602 may be fixed and defined as being 200 ms in length. Measurements may take place in a measurement gap 604 whereby the MTC UE tunes away to a different frequency to perform the measurements. In some cases, a measurement gap 604 may be 6 ms, allowing 5 ms for measurement 606 of the CRS and an additional 1 ms re-tuning time 608. This re-tuning time allows the MTC UE to tune away from the current narrowband region as the MTC UE may only receive on a narrow band at a time and may need to be retuned for inter-frequency, intra-frequency, and even serving cell measurements. In some cases, the measurement gap 604 may take up 6 ms for every 40 ms (40 ms subframes 610). A MTC UE may only be able to process two subframes of CRS over a 5 ms measurement gap. As a result, during a 200 ms measurement window, a MTC UE may measure at most 10 CRS subframes.

Coupling loss from the coverage enhancement may require the receiver and transmitter to perform cell measurements at extremely low signal to noise ratios (SNR), such as -15 dB to -20 dB. However, for geometries below -5 dB, 10 subframes may not afford enough measurements to be able to determine a sufficient average. For example, at -10 dB, a MTC UE may need 20-50 subframes, and at -15 dB, 100-200 subframes, to sufficiently measure RSRP. Therefore the currently defined measurement window may not be sufficient for MTC UEs with small coverage enhancements.

Example Configurations for a Measurement Gap and Window

For reasons described herein, aspects of the present disclosure include configurations for a measurement gap and measurement window for MTC UEs sufficient to support coverage enhancement. Due to coverage enhancements, current measurement gaps and windows may not be sufficient to obtain adequate cell measurements.

Figure 7:
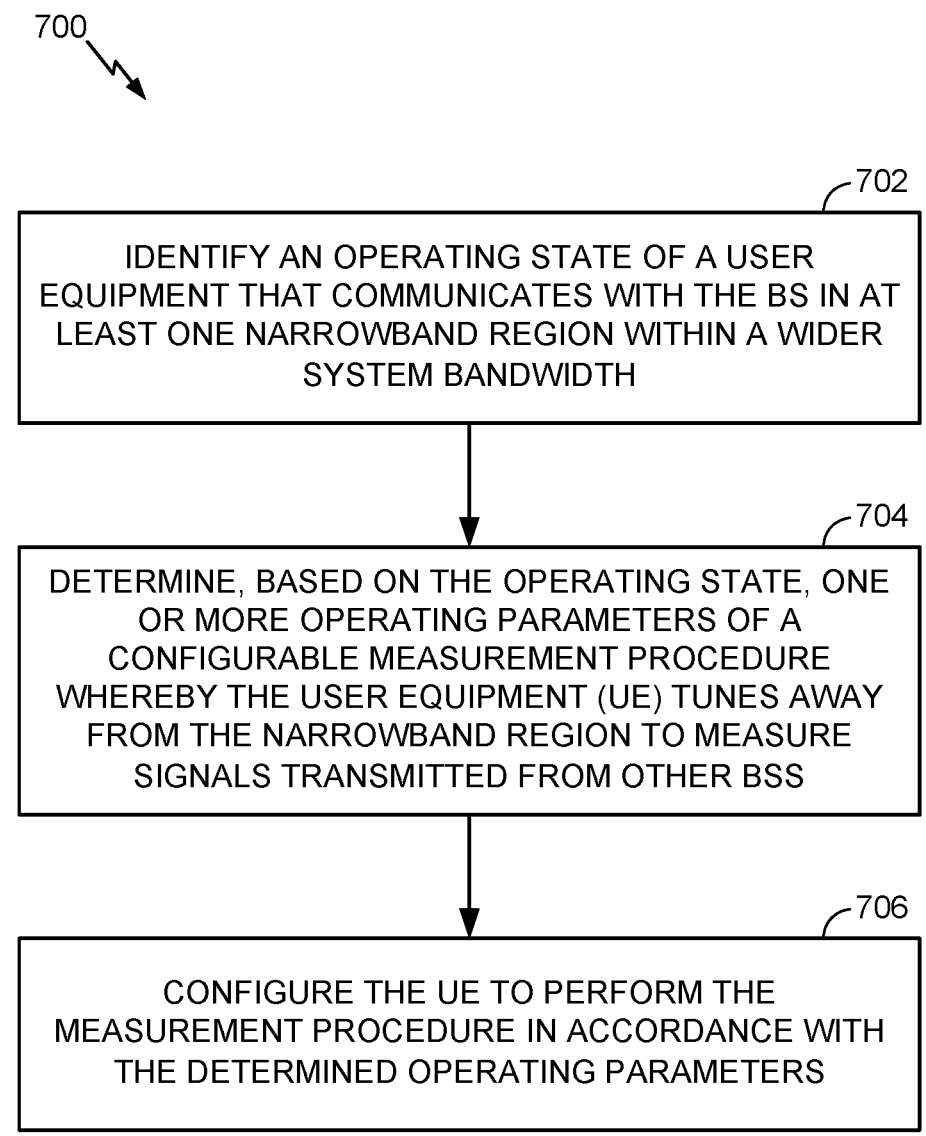
FIG. 7 illustrates example operations that may be performed by a base station, in accordance with certain aspects of the present disclosure.

FIG. 7 illustrates example operations 700 that may be performed by a base station. The operations 700 may begin at 702 by identifying an operating state of a user equipment that communicates with the BS in at least one narrowband region. At 704, the base station may determine, based on the operating state, one or more operating parameters of a configurable measurement procedure whereby the user equipment (UE) tunes away from the narrowband region to measure signals transmitted from other BS. At 706 the BS may configure the UE to perform the measurement procedure in accordance with the determined operating parameters.

Figure 8:
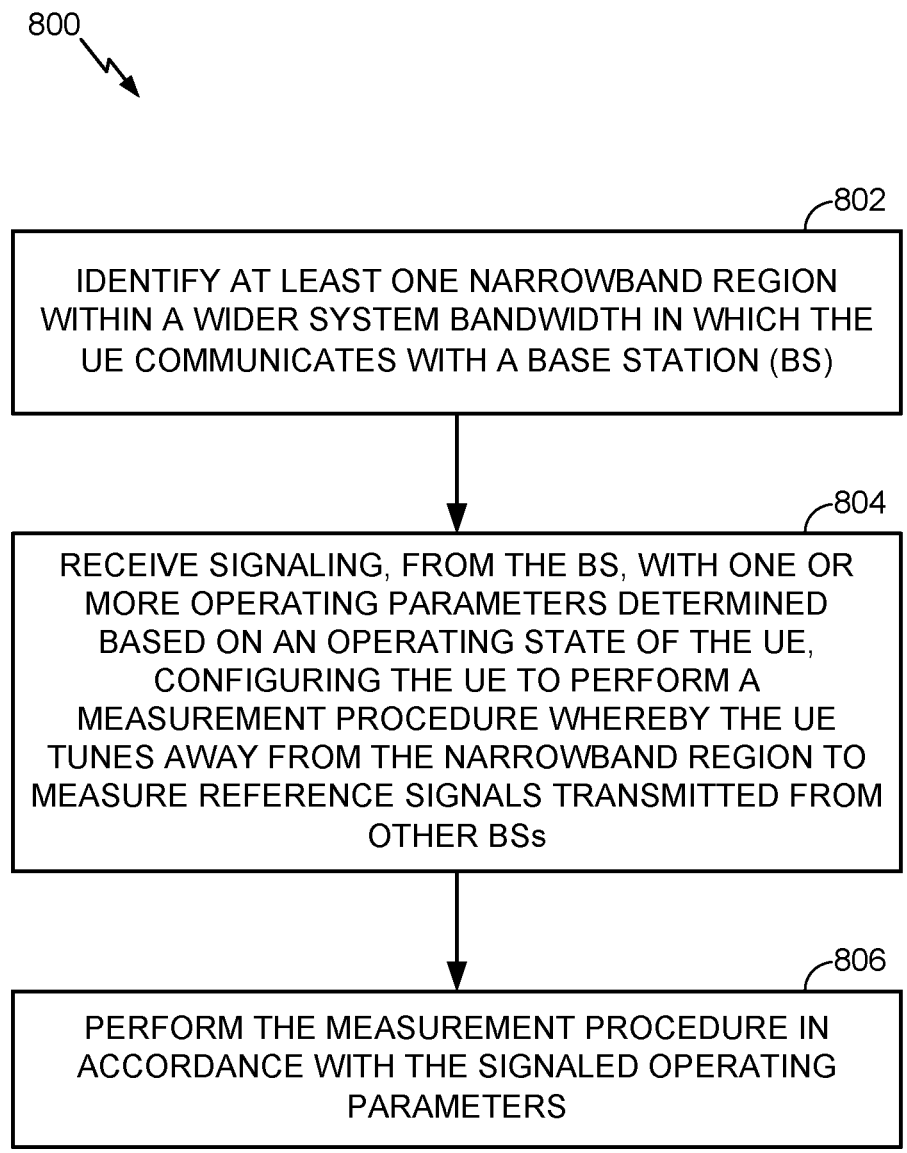
FIG. 8 illustrates example operations that may be performed by a user equipment, in accordance with certain aspects of the present disclosure.

FIG. 8 illustrates example operations 800 that may be performed by a user equipment. The operations 800 may begin at 802 by identifying at least one narrowband region in which the UE communicates with a base station (BS). At 804, the UE may receive signaling, from the BS, with one or more operating parameters determined based on an operating state of the UE, configuring the UE to perform a measurement procedure whereby the UE tunes away from the narrowband region to measure reference signals transmitted from other BSs. At 806, the UE may perform the measurement procedure in accordance with the signaled operating parameters.

It is expected that low cost, low rate devices such as MTC UEs may experience less mobility than experienced by non-MTC UEs. For example, sensors and tags may be affixed to structures that either do not move or rarely move. As such, periodic signal measurement while the MTC UE is in connected mode may not be as important. For example, a stationary MTC UE does not need to hand off from one network node to another while moving between coverage areas. As such, measurements may not be necessary where a MTC UE has a sufficiently good enough coverage.

Even where measurements may be necessary or desirable, the low mobility expected of MTC UEs may make it unnecessary to perform intra or inter-frequency measurements for coverage enhancement MTC UEs in connected mode. Where intra-frequency measurements may be necessary or desirable, the measurement gap may be reduced or eliminated.

Figure 9:
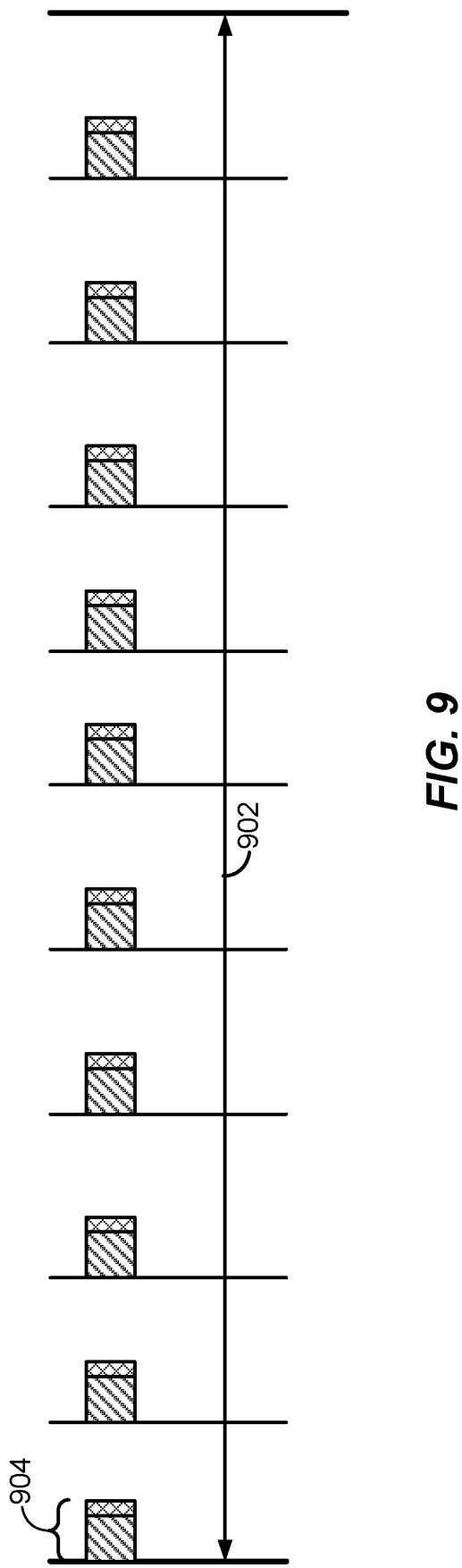
FIG. 9 illustrates an example configurable measurement window, in accordance with certain aspects of the present disclosure.

FIG. 9 illustrates an example configurable measurement window, in accordance with certain aspects of the present disclosure. In some embodiments, a measurement window may be configurable based on the coverage enhancement level used. For a MTC UE with coverage enhancement, the time length of the measurement window in which the MTC UE may make measurements may be configurable based on the level of coverage enhancements. For example, a 200 ms measurement window may be configured where the coverage enhancement is at -5 dB, while a 400 ms measurement window 902 may be configured where the coverage enhancement is at -10 dB.

Adjusting the measurement window based on the coverage enhancement allow the flexibility to scale the measurement window appropriate to the level of coverage enhancement. As the measurement gap 904 does not need be adjusted to accommodate the longer measurement window, the impact on the serving cell of a configurable measurement window based on the coverage enhancement level is limited to taking a longer time to obtain measurements. This configurable measurement window may be limited to a certain maximum value for the window or level of coverage enhancement.

In some embodiments, connect mode measurements may be disabled for MTC UEs with large coverage enhancement levels under certain conditions. Where a serving cell is determined to have good coverage, it is very likely that the coverage will remain good if mobility of the MTC UE is low. Where large coverage enhancement levels are used and MTC UE mobility is low, connected mode measurements may be disabled altogether.

In this scenario, the MTC UE may stop making measurements, or the MTC UE may continue to make measurements, but stops sending measurement reports to the serving cell. There is very little impact to the serving cell where the MTC UE stops sending measurement reports as the serving cell does not need to process a measurement report that is not sent. Additionally, as the serving cell does not need to receive and process measurement reports from the MTC UE, there are potentially fewer interruptions on the serving cell and facilitating bundling. Both the MTC UE and the BS may experience increased power savings when the MTC UE stops sending measurement reports. For example, on the BS side, the BS does not need to process measurement reports that are not transmitted by the MTC UE, and the MTC UE saves power by not sending the measurement report. Where a connection between the MTC UE and BS is broken, the MTC UE may restart the initial cell search and reconnect, which may result in interrupted service.

In some embodiments, measurements reports for MTC UEs with low or no coverage enhancement may be skipped under certain conditions. Where a SNR is high enough in a serving cell, measurement of neighboring cells may not provide much benefit, especially if mobility of the MTC UE is low. For example, for bandwidths of few hundred bits and below 16 quadrature amplitude modulation (QAM), an SNR about 10 dB may not make much of a difference in performance for downlink reception by an MTC UE.

Whether an SNR is high enough for a serving cell may be determined, for example, by whether RSRP and RSRQ measurements are above a certain threshold. This threshold may be adjustable, for example, based on the coverage enhancement level. For example, the threshold SNR may be adjusted higher when there is a higher level of coverage enhancement and the threshold SNR may be adjusted lower when there is lower levels of coverage enhancement. In these cases, the eNB may allow MTC UEs to skip measurements reports when there is a sufficiently high enough SNR, even when measurements are scheduled. This allows for power savings by the MTC UEs. Uplink transmissions may be impacted by the skipped measurement reports and the eNB may request the MTC UE to stop skipping measurements as needed.

In some embodiments, a measurement gap and measurement window for intra-frequency and serving cell measurements may be configured under certain conditions. For intra-frequency measurements, the measurement gap may configured based on whether the MTC UE and BS are synchronized. Where a MTC UE is synchronized to a BS, the MTC UE may not need to search for the PSS/SSS, allowing for a shorter measurement gap than may be used for other intra or inter-frequency measurements. Where a MTC UE is not synchronized with a BS, the MTC UE may continue to use the current measurement gap.

For serving cell measurements, a MTC UE may need to tune away from the current narrow band to another narrow band for measurements. Where the MTC UE and BS are synchronized, the measurement may be made more quickly, allowing for the measurement gap to be reduced. Additionally, such measurements may not be necessary, for example where SNR is high enough, and the MTC UE may be configured to skip such measurements.

In some embodiments, a measurement gap length may be configured by an eNB and it may be left up to an MTC UE to determine whether to make serving, intra-frequency, or inter-frequency measurements within the defined measurement gap, rather than having defined periodic measurements and the resulting overhead. Such a measurement configuration would allow the MTC UE flexibility to adjust the measurements to be made without incurring the extra network overhead to configure multiple measurement gaps and potentially saving power.

In some embodiments, if a serving or intra-frequency measurement does not use all of the available time in a measurement gap to perform a particular measurement, the MTC UE may be configured use the remaining time in the measurement gap for additional measurements. These measurements may be intra-frequency measurements.

In some embodiments, a measurement configuration may be configured in as needed bursts. These bursts may be scheduled as needed based, for example, on the amount of traffic a MTC UE is experiencing or will experience. While periodic measurements better take into account movement of the UE, where the MTC UE does not experience high amounts of mobility, configuring measurements on an as needed basis allows for power savings where such measurements are unnecessary without much impact on services as measurements are made when needed by services. Additionally, by configuring measurement bursts only when needed, overhead associated with periodically scheduled measurements may be reduced.

In some embodiments, a measurement gap may be configurable based on the level of coverage enhancement. For small levels of coverage enhancement, the measurement gap may be increased a small amount to allow the MTC UE more time to take measurements.

For example, for small levels of coverage enhancement, an increase in the measurement gap from 6 ms to 10 ms for every 40 ms allows for average over up to 20 subframes. Where coverage enhancements levels are larger, a larger increase in the measurement window may be used. As another example, a 40 ms measurement gap allows for up to 80 averages to be made. However, possible increases in the length of the measurement gap may be limited as there would be no serving cell service during the timeframe, resulting in too much overhead time.

Configurable Measurement Period Based on Bundled Transmission Size

According to certain aspects, measurement periods may be configured in a manner to avoid a collision between measurement gaps and bundled transmissions. This may help avoid the UE having to decide between missing a measurement gap or interrupting a bundled transmission. This may occur, for example, in UEs with large coverage enhancement utilizing a large bundled transmission size (a large number of repeated transmission).

Figure 10:
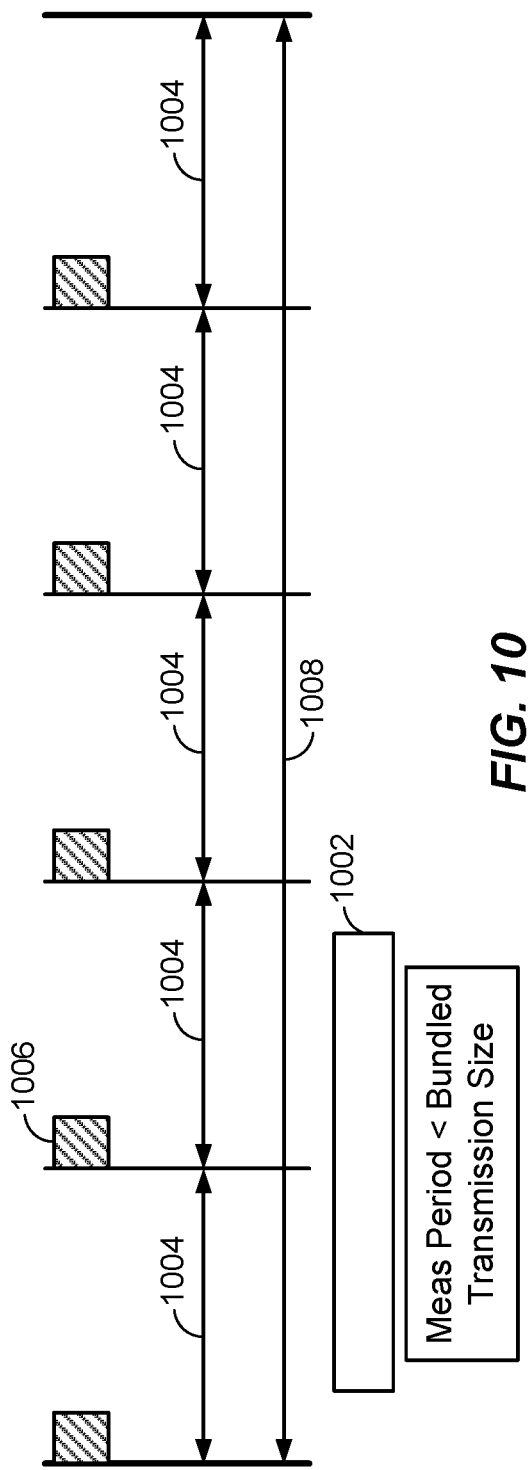
FIG. 10 illustrates example measurement periods, in accordance with certain aspects of the present disclosure.

This scenario is illustrated in FIG. 10, in which, during a measurement window 1008 (here 200 ms) a bundled transmission 1002 size is longer than a measurement period 1004 (40 ms in this example). As a result, at least one measurement gap 1006 (5 ms) occurs during the scheduled time for the bundled transmission 1002. In this case, the bundled transmission 1002 may be punctured by the measurement gap 1006 (e.g., that portion of the bundled transmission 1002 during the measurement gap 1006 is discarded by the base station) or the bundled transmission 1002 may be delayed (or paused/interrupted/cut short). Puncturing the bundled transmission 1002 or delaying the bundled transmission 1002 both may have adverse impacts on performance. For example, puncturing the bundled transmission 1002 may reduce the likelihood of a successful decoding, while delaying the bundled transmission 1002 may have an impact on schedule timelines, potentially bringing a UE out of alignment with other UEs.

To account for this scenario, aspects of the present disclosure may provide for configuring measurement periods such that measurement gaps do not collide with bundled transmissions. For example, measurement periods may be configured to be longer than a bundled transmission size. Bundled transmissions may be aligned with such measurement gaps, so the bundled transmission can finish without being interrupted by the measurement gaps.

Figure 11:
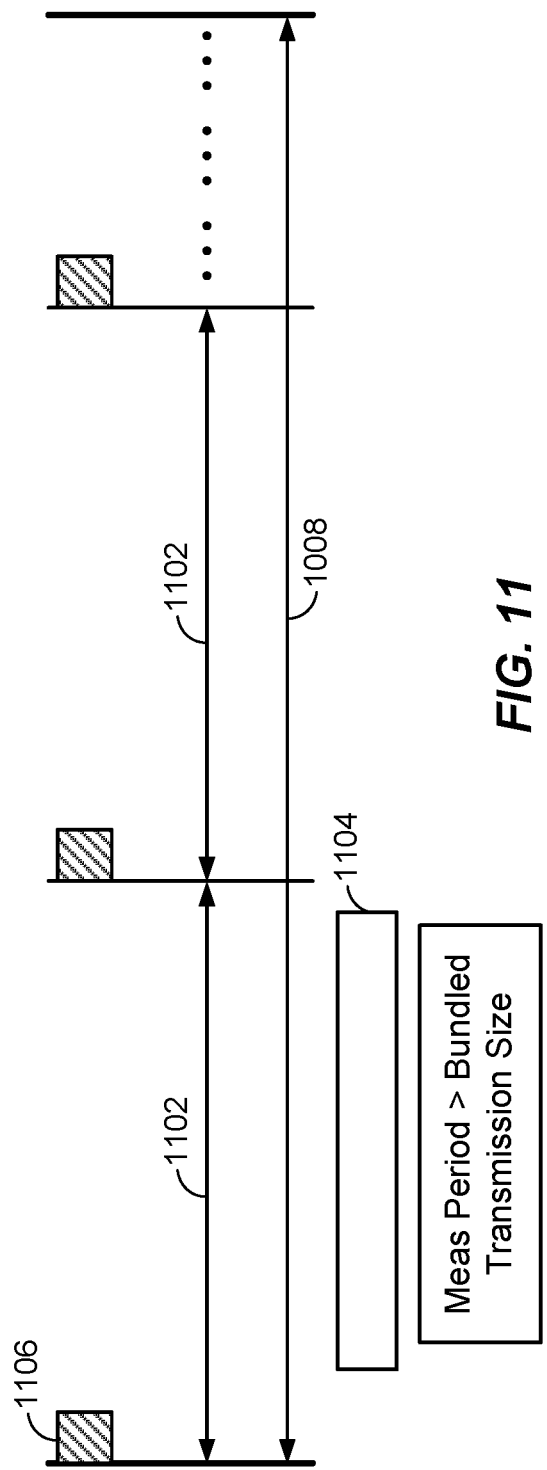
FIG. 11 illustrates example configured measurement periods longer than a bundled transmission, in accordance with certain aspects of the present disclosure.

For example, as illustrated in FIG. 11, a measurement period 1102 (120 ms in this example) may be configured to be greater than the bundled transmission 1104 size. As illustrated, the bundled transmission 1104 and measurement gap 1106 may also be aligned such that there is no overlap (e.g., the bundled transmission 1104 is scheduled to occur just after measurement gap 1106, which occurs at a beginning of the measurement period).

As illustrated, the measurement window 1108 (over which measurements occur) may also be adjusted accordingly (e.g., to 600 ms to allow for measurements over 5 measurement periods). According to certain aspects, an eNB may update measurement periods whenever a UE is scheduled with a bundled transmission size greater than or equal to a current measurement period. In some cases, a set of fixed measurement periods may be used (e.g., 40, 80, and 120 ms) and an eNB may signal (e.g., broadcast) which UEs are to use which measurement period. In some cases, a UE may automatically select a longer measurement period when using a bundled transmission size (which is common knowledge between the eNB and UE for a given CE level) larger than other fixed measurement periods. In some cases, an eNB may signal a new measurement period to the UE (e.g., using dynamic signaling).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for identifying, means for configuring, or means for performing may include one or more processors, such as the receive processor 258 and/or the controller/processor 280 of the UE 120 illustrated in FIG. 2 and/or the transmit processor 220 and/or the controller/processor 240 of the base station 110 illustrated in FIG. 2. Means for receiving may comprise a receive processor (e.g., the receive processor 258) and/or an antenna (s) 252 of the user terminal 120 illustrated in FIG. 2. Means for transmitting may comprise a transmit processor (e.g., the transmit processor 220) and/or an antenna(s) 234 of the eNB 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station (BS), comprising:
    identifying an operating state of a user equipment (UE) that communicates with the BS in at least one narrowband region, wherein the operating state corresponds to a certain level of coverage enhancement (CE) of the UE utilizing bundled transmissions whereby transmissions are repeated;
    determining, based on the operating state, one or more operating parameters of a configurable measurement procedure whereby the UE tunes away from the narrowband region to measure signals transmitted from other BSs while in connected mode with the BS, wherein the determining comprises determining a first measurement gap or measurement window for intra-frequency measurements within a same carrier frequency as used by the BS, wherein the determining comprises:
        determining, if the level of CE is at or above a first threshold value, a first one or more parameters that indicate a second measurement gap or measurement window; and
        determining, if the level of CE is below the first threshold value, a second one or more parameters that indicate a third measurement gap or measurement window, wherein the second one or more parameters are greater than the first one or more parameters; and
    configuring the UE to perform the measurement procedure in accordance with the determined operating parameters.

2. The method of claim 1, wherein the operating state also corresponds to a mobility of the UE.

3. The method of claim 1, wherein the determining comprises:
    determining, if the level of CE is at or above a second threshold value, a third one or more parameters that result in a first number of reference signals measured by the UE in a measurement window; and
    determining, if the level of CE is below the second threshold value, a fourth one or more parameters that result in a second number of reference signals measured by the UE in the measurement window, wherein the second number is greater than the first number.

4. The method of claim 1, wherein the determining comprises determining one or more parameters that disable the UE from performing the measurement procedure while in the connected mode.

5. The method of claim 1, wherein the determining comprises determining one or more parameters that cause the UE to skip reporting the measurement procedure if:
    the level of CE is below a second threshold value; and
    a signal to noise ratio (SNR) of a connection between the UE and BS is above a threshold level.

6. The method of claim 1, wherein the determining comprises:
    determining a fourth measurement gap or measurement window for inter-frequency measurements in one or more other carrier frequencies.

7. The method of claim 1, further comprising:
    determining a fourth measurement gap or measurement window for other narrow band measurements.

8. The method of claim 1, wherein the determining comprises:
    determining a fourth measurement gap or measurement window for serving cell, intra-frequency, and inter-frequency measurements; and
    configuring the UE to perform the measurement procedure based on the fourth measurement gap or measurement window, wherein the UE can choose whether to perform serving, intra-frequency or inter-frequency measurements at a measurement opportunity.

9. The method of claim 8, wherein the UE is configured to perform another measurement procedure in a remaining portion of the fourth measurement gap if:
    a serving or intra-frequency measurement procedure does not utilize all of the fourth measurement gap.

10. The method of claim 1, wherein the determining comprises:
    determining one or more parameters to configure the UE for a burst measurement.

11. The method of claim 1, wherein the determined operating parameters further comprise a measurement period selected to be greater than a bundled transmission size.

12. A method for wireless communications by user equipment (UE), comprising:
communicating with a base station (BS) via at least one narrowband region;
receiving signaling, from the BS, indicating one or more operating parameters determined based on an operating state of the UE, wherein the operating state corresponds to a certain level of coverage enhancement (CE) of the UE utilizing bundled transmissions whereby transmissions are repeated, wherein the one or more operating parameters configure the UE to perform a measurement procedure whereby the UE tunes away from the narrowband region to measure reference signals transmitted from other BSs while in connected mode with the BS, wherein the one or more operating parameters indicate a first measurement gap or measurement window for intra-frequency measurements within a same carrier frequency as used by the BS, and wherein the one or more operating parameters comprise:
if the level of CE is at or above a first threshold value, a first one or more parameters that indicate a second measurement gap or measurement window; and
if the level of CE is below the first threshold value, a second one or more parameters that indicate a third measurement gap or measurement window, wherein the second one or more parameters are greater than the first one or more parameters; and
performing the measurement procedure in accordance with the signaled operating parameters.

13. The method of claim 12, wherein the operating state also corresponds to a mobility of the UE.

14. The method of claim 12, wherein the one or more operating parameters comprise:
if the level of CE is at or above a second threshold value, a third one or more parameters that result in a first number of reference signals measured by the UE in a measurement window; and
if the level of CE is below the second threshold value, a fourth one or more parameters that result in a second number of reference signals measured by the UE in the measurement window, wherein the second number is greater than the first number.

15. The method of claim 12, wherein the one or more operating parameters comprise one or more parameters that disable the UE from performing the measurement procedure while in the connected mode.

16. The method of claim 12, wherein the one or more operating parameters comprise one or more parameters that cause the UE to skip reporting the measurement procedure if:
the level of CE is below a second threshold value; and
a signal to noise ratio (SNR) of a connection between the UE and BS is above a threshold level.

17. The method of claim 12, wherein the one or more operating parameters indicate:
a fourth measurement gap or measurement window for inter-frequency measurements in one or more other carrier frequencies.

18. The method of claim 12, wherein the one or more operating parameters indicate:
a fourth measurement gap or measurement window for other narrow band measurements.

19. The method of claim 12, wherein the one or more operating parameters indicate a fourth measurement gap or measurement window for serving cell, intra-frequency, and inter-frequency measurements; and
wherein the UE is configured to perform the measurement procedure based on the second measurement gap or measurement window and to choose whether to perform serving, intra-frequency, or inter-frequency measurements at a measurement opportunity.

20. The method of claim 19, further comprising:
determining that a serving or intra-frequency measurement procedure does not utilize all of the fourth measurement gap; and
performing another measurement procedure in a remaining portion of the fourth measurement gap.

21. The method of claim 12, wherein the one or more operating parameters further comprise:
one or more parameters for performing a burst measurement.

22. The method of claim 12, wherein the one or more operating parameters further comprise a measurement period selected to be greater than a bundled transmission size.

23. An apparatus for wireless communications, comprising:
at least one processor configured to:
identify an operating state of a user equipment (UE) that communicates with the apparatus in at least one narrowband region, wherein the operating state corresponds to a certain level of coverage enhancement (CE) of the UE utilizing bundled transmissions whereby transmissions are repeated;
determine, based on the operating state, one or more operating parameters of a configurable measurement procedure whereby the UE tunes away from the narrowband region to measure signals transmitted from other BSs while in connected mode with the apparatus, wherein the one or more operating parameters comprise a first measurement gap or measurement window for intra-frequency measurements within a same carrier frequency as used by the BS, wherein the at least one processor is configured to:
determine, if the level of CE is at or above a first threshold value, a first one or more parameters that indicate a second measurement gap or measurement window; and
determine, if the level of CE is below the first threshold value, a second one or more parameters that indicate a third measurement gap or measurement window, wherein the second one or more parameters are greater than the first one or more parameters; and
configure the UE to perform the measurement procedure in accordance with the determined operating parameters; and
a memory coupled to the at least one processor.

24. An apparatus for wireless communications, comprising:
a transmitter and a receiver configured to communicate with a base station (BS) via at least one narrowband region at a certain level of coverage enhancement (CE) utilizing bundled transmissions whereby transmissions are repeated;
at least one processor configured to:
receive signaling, from the BS, indicating one or more operating parameters determined based on an operating state of the apparatus, wherein the operating state corresponds to a certain level of coverage enhancement (CE) of the apparatus utilizing bundled transmissions whereby transmissions are repeated, wherein the one or more operating parameters configure the apparatus to perform a measurement procedure whereby the apparatus tunes away from the narrowband region to measure reference signals transmitted from other BSs while in connected mode with the BS, wherein the one or more operating parameters indicate a first measurement gap or measurement window for intra-frequency measurements within a same carrier frequency as used by the BS, and wherein the one or more operating parameters comprise:

if the level of CE is at or above a first threshold value, a first one or more parameters that indicate a second measurement gap or measurement window; and if the level of CE is below the first threshold value, a second one or more parameters that indicate a third measurement gap or measurement window, wherein the second one or more parameters are greater than the first one or more parameters; and perform the measurement procedure in accordance with the signaled operating parameters; and a memory coupled to the at least one processor.

25. The method of claim 1, wherein a time length of the first measurement gap or measurement window is based on a synchronization state between the BS and the UE.

26. The method of claim 12, wherein a time length of the first measurement gap or measurement window is based on a synchronization state between the BS and the UE.

* * * * *